United States Patent
Caracciolo, Jr.

(10) Patent No.: US 6,348,227 B1
(45) Date of Patent: Feb. 19, 2002

(54) METHOD OF REDUCING MICROBIAL GROWTH DURING PROCESSING OF ANIMAL CARCASSES

(75) Inventor: Louis D. Caracciolo, Jr., Atco, NJ (US)

(73) Assignee: BOC Group, Inc., Murray Hill, NJ (US)

(*) Notice: Subject to any disclaimer, the term of this patent is extended or adjusted under 35 U.S.C. 154(b) by 0 days.

(21) Appl. No.: 09/688,734

(22) Filed: Oct. 17, 2000

Related U.S. Application Data

(62) Division of application No. 09/232,822, filed on Jan. 19, 1999, now Pat. No. 6,167,709, which is a division of application No. 08/711,779, filed on Sep. 10, 1996, now Pat. No. 5,879,732.

(51) Int. Cl.[7] .......................... A23L 3/34; A23L 3/3418
(52) U.S. Cl. ........................................ 426/332; 426/335
(58) Field of Search ................................. 426/332, 335

(56) References Cited

U.S. PATENT DOCUMENTS

| | | | |
|---|---|---|---|
| 1,538,369 A | 5/1925 | Akiyama |
| 1,703,468 A | 2/1929 | Biesen |
| 2,169,081 A | 8/1939 | James |
| 2,339,507 A | 1/1944 | Nagy et al. |
| 2,524,182 A | 10/1950 | Teigen |
| 3,025,170 A | 3/1962 | Murphy et al. |
| 3,255,599 A | 6/1966 | Morrison |
| 3,304,733 A | 2/1967 | Coffman |
| 3,421,836 A | 1/1969 | Sundin et al. |
| 3,479,688 A | 11/1969 | Hoersch |
| 3,523,891 A | 8/1970 | Mehl |
| 3,546,114 A | 12/1970 | Dietz et al. |
| 3,549,528 A | 12/1970 | Armstrong |
| 3,613,386 A | 10/1971 | Klee |
| 3,637,405 A | 1/1972 | Mendelson et al. |
| 3,689,958 A | 9/1972 | Dillon |
| 3,709,142 A | 1/1973 | Peterson |
| 3,715,891 A | 2/1973 | Martin |
| 3,729,773 A | 5/1973 | Dillon |
| 3,743,523 A | 7/1973 | Bodine |
| 3,745,026 A | 7/1973 | Hansen et al. |
| 3,769,807 A | 11/1973 | Foster |
| 3,958,026 A | 5/1976 | Leone et al. |
| 4,021,585 A | 5/1977 | Svoboda et al. |
| 4,171,625 A | 10/1979 | Morgan et al. |
| 4,180,592 A | 12/1979 | Buckley et al. |
| 4,196,221 A | 4/1980 | Dew |
| 4,245,483 A | 1/1981 | Murai |
| 4,309,388 A | 1/1982 | Tenney et al. |

(List continued on next page.)

FOREIGN PATENT DOCUMENTS

EP      0 434 278 A1      6/1991

OTHER PUBLICATIONS

Rice et al., "Review of the Applications of Ozone for Increasing Storage Times of Perishable Foods;" Science and Engineering, vol. 4, pp. 147 and 157 (1992), Pergamon Press Ltd.

(List continued on next page.)

Primary Examiner—Helen Pratt
(74) Attorney, Agent, or Firm—Finnegan, Henderson, Farabow, Garrett & Dunner, L.L.P.

(57) ABSTRACT

Various food processing methods and a food processing system minimize microbial growth while an animal, such as a chicken, is processed into food. During processing, temperature of an animal carcass and atmosphere surrounding the carcass are controlled by spraying gases and a mixture of ozone and water on the carcass, directing the gases through a passage in a wall to cool a processing area, and flowing the gases into atmosphere surrounding the carcass. Preferably, the gases include ozone and cryogenic gases recycled from a cryogenic freezer. The system uses a reduced amount of fresh water by recycling water used during food processing.

10 Claims, 8 Drawing Sheets

U.S. PATENT DOCUMENTS

| | | | |
|---|---|---|---|
| 4,309,795 A | 1/1982 | Simonsen | |
| 4,325,221 A | 4/1982 | Grewar | |
| 4,367,630 A | 1/1983 | Bernard et al. | |
| 4,403,479 A | 9/1983 | Rasovich | |
| 4,477,357 A | 10/1984 | Sittenfield | |
| 4,484,517 A | 11/1984 | Amann | |
| 4,517,159 A | 5/1985 | Karlson | |
| 4,549,477 A | 10/1985 | McCabe, Jr. | |
| 4,627,924 A | 12/1986 | Coste | |
| 4,666,722 A | 5/1987 | Creed et al. | |
| 4,827,727 A | 5/1989 | Caracciolo | |
| 4,849,237 A | 7/1989 | Hurst | |
| 4,933,411 A | 6/1990 | Gifford | |
| 4,934,151 A | 6/1990 | Shima | |
| 4,944,068 A | 7/1990 | Covell, III | |
| 4,996,741 A | 3/1991 | Covell, III | |
| 5,011,699 A | 4/1991 | Mitsuda et al. | |
| 5,053,140 A | 10/1991 | Hurst | |
| 5,054,292 A | 10/1991 | Klee | |
| 5,087,466 A | 2/1992 | Coudrains et al. | |
| RE33,852 E | 3/1992 | Gibot et al. | |
| 5,173,190 A | 12/1992 | Picek | |
| 5,184,471 A | 2/1993 | Losacco et al. | |
| 5,227,184 A | 7/1993 | Hurst | |
| 5,256,434 A | 10/1993 | Conway | |
| 5,262,047 A | 11/1993 | Benskin et al. | |
| 5,318,708 A | 6/1994 | Benskin et al. | |
| 5,322,623 A | 6/1994 | Benskin et al. | |
| 5,352,467 A | 10/1994 | Mitchell et al. | |
| 5,447,640 A | 9/1995 | Omi et al. | |
| 5,452,588 A | 9/1995 | Onodera | |
| 5,484,332 A | 1/1996 | Leech et al. | |
| 5,484,615 A | 1/1996 | Kounev | |
| 5,667,829 A | 9/1997 | Herlig | |
| 5,879,732 A * | 3/1999 | Caracciolo, Jr. et al. | 426/231 |
| 6,167,709 B1 * | 1/2001 | Caracciolo, Jr. et al. | 62/64 |

OTHER PUBLICATIONS

"Industrial Prospectus," Improving Poultry Industry Competitiveness A Collaborative Project; Electric Power Research Institute, Inc. (EPRI), May, 1994.

Equipment Specs, "Kwikfreeze® Modular $CO_2/N_2$ Tunnel Freezers Model: KFT 36–10M"; BOC Gases (1995).

Equipment Specs, "Kwikfreeze® Fluidized Bed Freezer"; BOC Gases (1996).

Equipment Specs, "Accu–Chill™ Combo Cooler For Consistent Meat Temperature Profiles"; BOC Gases (1995).

Equipment Specs, "Kwikfreeze® Spiral Freezer A Versatile Family of Carbon Dioxide and Nitrogen Freezers"; BOC Gases (1995).

Products in Process "Cool Operator" reprinted from Refrigerated & Frozen Foods, Serving Food Processor, Stagnito Publishing, vol. 5, No. 5, May 1994; BOC Gases (1994).

Sheldon et al., "Efficacy of Ozone As A Disinfectant for Poultry Carcasses And Chill Water"; Journal of Food Science, vol. 51, No. 2, pp. 305–309 (1986).

Kaess et al., "Ozone Treatment of Chilled Beef"; J. Fd. Technol., vol. 3, pp. 325–334 (1968).

"Accepted Meat and Poultry Equipment"; U.S. Department of Agriculture, Food Safety and Inspection Service, Science and Technology MPI–2, FSIS Directive 11220.1; cover, table of contents, pp. 1–18 and 76.

Fetner, et al. "Bactericidal Activity of Ozone and Chlorine Against Escherichia coli at 1° C", Advances in Chemistry Series, pp. 370–374.

Nagy, "Application of Ozone From Sterilamp in Control of Mold, Bacteria, and Odors", Advances in Chemistry Series, pp. 57–65.

Sheldon, et al. "Efficacy of Ozone as a Disinfectant for Poultry Carcasses and Chill Water", vol. 51, No. 2, 1986, Journal of Food Science, pp. 305–309.

Flogstad, et al. "Treatment of Humic Waters by Ozone", Ozone Science & Engineering, vol. 7, pp. 121–135, 1985.

Horvath et al., Ozone, pp. 305–312, pp. 322–323, pp. 326–327 & pp. 330–331, Applications in the Food Industry and Agriculture; Other Fields of Utilization.

Yonova, et al., "Studies on Some Physical Methods (Ultra Sound) and Disinfection Means as Decontaminating the Water in Poultry Meat Production", Veterinary Sciences, vol. XVIII, No. 4, 1981.

* cited by examiner

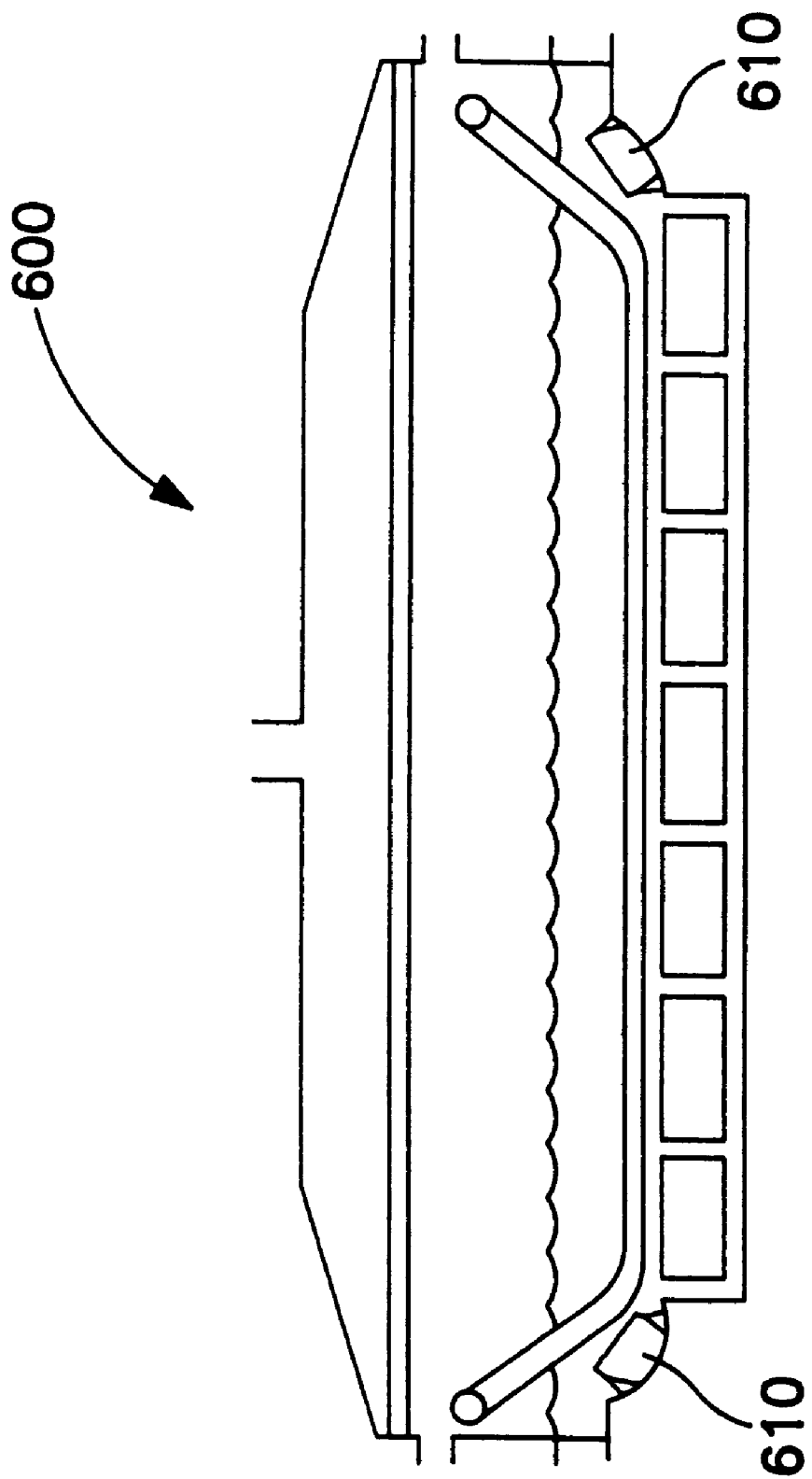

METHOD OF REDUCING MICROBIAL GROWTH DURING PROCESSING OF ANIMAL CARCASSES

This is a divisional of application Ser. No. 09/232.822, filed Jan. 19, 1999 now U.S. Pat. No. 6,167,709, which is a divisional of application Ser. No. 08/711.779, filed Sep. 10, 1996 (now U.S. Pat. No. 5,879,732). Each of these prior applications is incorporated herein by reference.

BACKGROUND OF THE INVENTION

1. Field of the Invention

The present invention relates to a food processing method and system. More particularly, the present invention relates to a method and system for minimizing microbial growth while an animal is processed into food. In addition, the present invention relates to controlling temperature and reducing the need for fresh water during food processing.

2. Description of Related Art

The health conscious public demands food that is safe, sanitary, and free of microorganisms and chemicals. In addition, government health and safety agencies regulate the quality of food. Although the food industry attempts to meet the demands of both the public and the government, large scale food preparing operations inevitably provide environments favorable for the growth of harmful bacteria, fungi, and other microorganisms.

Large facilities for processing live animals into food have been in use for a number of years. Many of these facilities, however, lack adequate equipment and controls to reduce the growth of potentially harmful microorganisms. Lack of sufficient cooling, atmosphere control, and cleansing are some of the primary reasons microbes thrive during food processing.

In most conventional food processing facilities, an animal carcass is cooled only after the carcass is processed to remove viscera and cut into portions. (As used herein, the term "carcass" generally means a whole animal body or a portion of the animal body) Immediately after an animal is slaughtered, however, the resulting carcass is at a temperature that is approximately the same as the body temperature of the animal. This warm temperature of the carcass promotes microbial growth up until the time when the carcass is finally cooled. Because a great amount of time normally passes from when an animal is slaughtered to when the processed carcass is cooled, significant growth of microbes can occur.

The atmosphere within a food processing facility also affects microbial growth during food processing. Many different types of microorganisms thrive on gases such as oxygen, but little or no attempt is made to control the relative amounts of these gases during food processing. In addition, many of the existing food processing facilities do not use gases, such as ozone, nitrogen, carbon dioxide, and argon, which can control microbial growth without contaminating the resulting food.

Poor cleaning of both animals and processing machines is yet another reason for microbial contamination. Typically, animals, such as chickens, are shipped to a food processing facility and slaughtered before they have been washed. The filth, fecal matter, and dirt carried by these animals often spread throughout an entire food processing facility, resulting in contaminated food.

As machines process one animal carcass after another, they often cross contaminate carcasses and assist in spreading microbes. Fresh water or water in combination with chemicals is used to wash the machines, but the water alone is ineffective for killing microbes, and the chemicals added to water often pollute the water to a level requiring special disposal procedures. Because most conventional food processing facilities use a significant amount of fresh water, they cannot be located in areas lacking a large source of fresh water.

In light of the foregoing, there is a need in the art for a method and system for processing food to reduce microbial growth and to eliminate the need for excessive amounts of fresh water.

SUMMARY OF THE INVENTION

Accordingly, the present invention is directed to a method and system for processing a live animals into food so that microbial growth is minimized.

In addition, the invention is directed to a method and system for animal processing without the need for an excessive amount of fresh water.

To achieve these and other advantages and in accordance with the purpose of the invention, as embodied and broadly described herein, the invention includes a food processing method comprising the steps of slaughtering an animal to produce a carcass, conveying the carcass to a processing area, processing the carcass in the processing area to convert the carcass into food, and controlling, during the processing step, temperature of the carcass with at least one of a group consisting of gas and a mixture of water and ozone.

In one aspect of the invention, the gas includes ozone and is sprayed on the carcass to cool the carcass cryogenically.

In another aspect, the mixture of ozone and water is sprayed on the carcass to cool the carcass.

In another aspect, the sprayed water is collected, purified, and reused during processing.

In another aspect, temperature is sensed in the processing area and cold gas is flowed into atmosphere of the processing area when the sensed temperature is above a predetermined amount.

In another aspect, cold gas passes through a passage arranged in a wall of the processing area so that the cold gas flows through the passage to remove heat from the processing area through the wall.

In still another aspect, food is frozen in a freezer by spraying the food with a cryogenic gas, the gas sprayed in the freezer is collected, and the carcass is cooled during the processing step with the collected gas.

In an additional aspect, the amount of a predetermined gas is sensed and the predetermined gas is added into the processing area based on the sensed amount.

Additionally, the present invention includes a system comprising walls forming a partially enclosed room having an entrance and exit, a conveyor for conveying an animal carcass from the entrance to processing equipment positioned in the room, gas supply lines communicating with the room, the gas supply lines being coupled to gas sources, at least one sensor for sensing at least one of the amount of a predetermined types of gases in the room and the temperature in the room, and a controller for regulating flow of gas in the supply lines according to at least one of the sensed amount and the temperature so that microbial growth in the room is reduced.

In another aspect, the animal carcass is sprayed, while it is being processed, with a mixture of ozone and water to reduce microbial growth on the carcass.

In yet another aspect, microbes are reduced during animal slaughter by introducing into the slaughter area a mixture of gases including ozone and at least one of the group consisting of nitrogen, argon, and carbon dioxide so that the mixture of gases kills the animal and reduces the amount of microbes on the animal.

In still another aspect, gas is sprayed within a cavity of the carcass to reduce microbial growth and cool the carcass.

Further, the invention includes a conduit sized for insertion into an animal carcass, first and second sprayers for coupling to a source of a mixture of ozone gas and water, and a shield for shielding the carcass from contact with substances sprayed off of the conduit.

In an additional aspect, ultrasonic oscillations are emitted in a chilled bath of ozone and water to loosen microbes from an exterior surface of the animal carcass.

In another aspect, an exterior surface of an animal carcass is heated to open pores and trisodium phosphate is sprayed on the carcass while the pores are open.

In still another aspect, feathers are removed from the exterior of a fowl carcass and the carcass is sprayed with at least one of an ozone and water mixture and trisodium phosphate.

In a further aspect, a live animal is washed with a mixture of ozone and water.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

FIG. 6 is a partial view of a washer used in one or more of the processing areas shown in FIG. 1;

FIG. 10 is a partial view of a chiller used in one of the processing areas shown in FIG. 1.

DESCRIPTION OF THE PREFERRED EMBODIMENTS

Reference will now be made in detail to the present preferred embodiments of the invention, examples of which are illustrated in the accompanying drawings.

In accordance with the invention, a system is provided for processing live animals into food. As embodied in FIG. 1, the system includes a plurality of processing areas 10a–10j in which individual tasks are performed during food processing. Each of the processing areas 10a–10j is a room or chamber containing equipment associated with processing animals into food, and adjacent pairs of the processing areas 10a–10j are interconnected so that the processing areas 10a–10j form an elongated tunnel structure.

As described in more detail below, live animals are washed in the processing area 10a and slaughtered in the processing area 10b. The resulting carcasses are then conveyed through processing areas 10c–10j where they are processed into food. In at least some of the processing areas 10a–10j, the interior atmosphere, temperature, and amount of microbes are controlled during processing to reduce microbial growth and prolong shelf life of the processed food.

Figure 1:
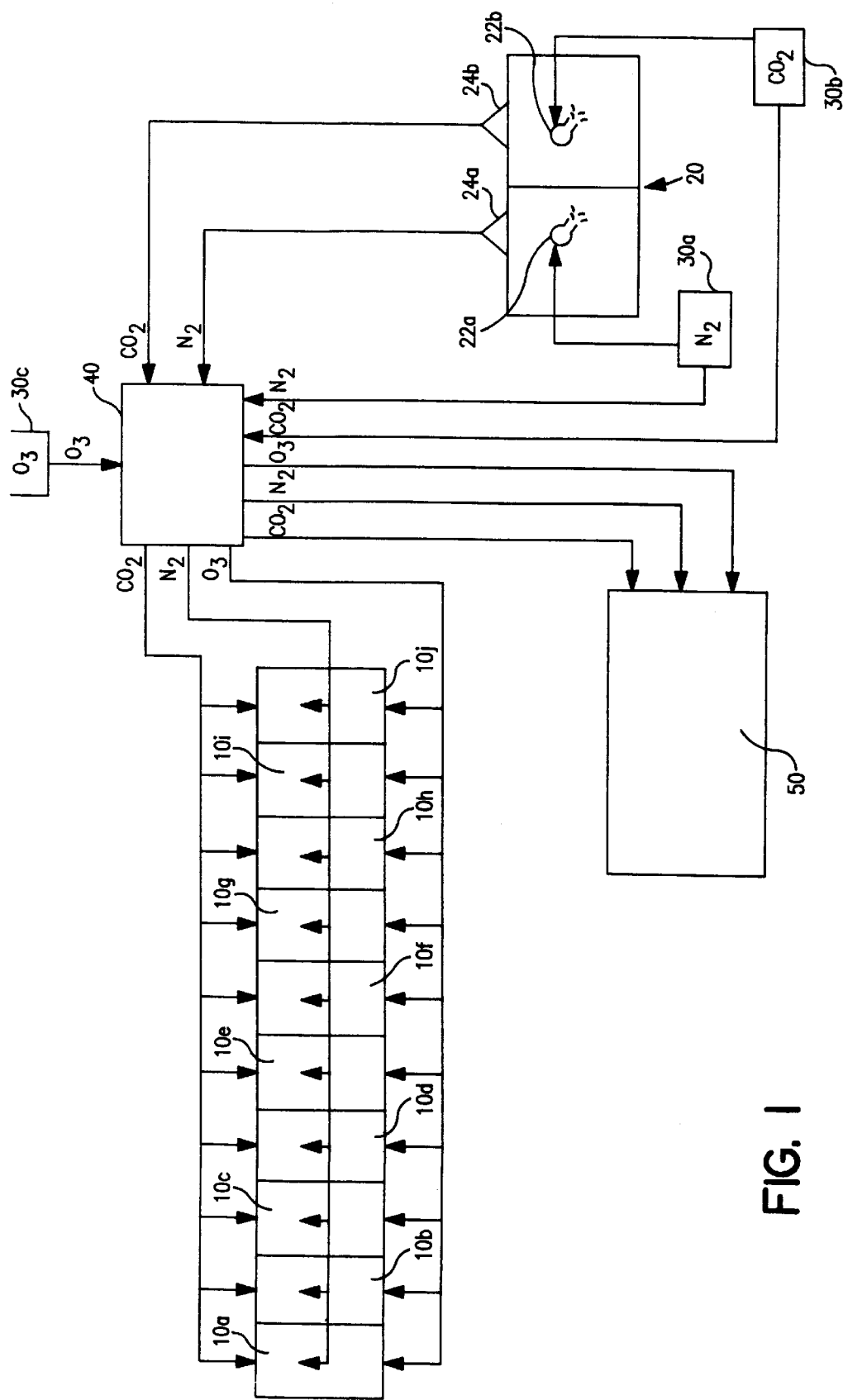
FIG. 1 is a schematic view of a preferred embodiment of the food processing system and includes lines representing gas flows in the system.

As shown in FIG. 1, a cryogenic freezer 20 is provided to freeze food after it is processed in the processing areas 10a–10j. The cryogenic freezer 20 includes nozzles 22a and 22b respectively coupled to a source 30a of compressed nitrogen gas and a source 30b of compressed carbon dioxide-gas. The nozzles 22a and 22b respectively spray food with the nitrogen and carbon dioxide gases, and, as these gases expand and cool, they absorb heat to freeze the food in the cryogenic freezer 20.

Individuals of ordinary skill in the art will recognize that many different types of cryogenic gases may be sprayed in the cryogenic freezer 20 and many different types of cryogenic freezers may be used. For example, one of the nozzles 22a and 22b could spray compressed air, argon, oxygen, or a mixture including nitrogen, carbon dioxide, and/or compressed air. In preferred embodiments, the cryogenic freezer 20 is a tunnel freezer having nozzles for spraying a cryogen on food conveyed on a conveyor belt, a spiral freezer having nozzles for spraying cryogen on food conveyed on a spiral conveyor, a fluidized bed conveyer having nozzles for creating a fluidized bed of food and cryogen, or a cooler having nozzles for spraying a cryogen on food conveyed on a turntable.

Although the cryogenic freezer 20 includes nozzles 22a and 22b in the preferred embodiments, other configurations without nozzles are possible. For example, the cryogenic freezer 20 could be an immersion freezer having a conveyor for moving food through a bath of cryogen.

Vents 24a and 24b respectively collect nitrogen gas, carbon dioxide gas, and any other cryogenic gases, such as air, after they are sprayed in the cryogenic freezer 20. At the time these gases are collected, they are still extremely cold. For example, the temperature of the gases may be approximately —50° F. (—45.6° C.).

In contrast to conventional freezing processes in which cold cryogenic gases are released into the atmosphere after being sprayed, the system of the present invention reuses or "recycles" the cold gases after they are collected. As explained in more detail below, the collected gases are used to cool food and/or asphyxiate microbes during food processing to reduce thereby microbial growth.

After the vents 24a and 24b collect the cold gases such as nitrogen and carbon dioxide, these cold gases are directed separately to a controller 40 coupled to the cryogenic freezer 20. Nitrogen and carbon dioxide also flow to the controller 40 directly from the source 30a of compressed nitrogen gas and the source 30b of compressed carbon dioxide gas. Other gas sources may also be connected to the controller 40. For example, the controller 40 may be connected to a source of oxygen, a source of argon, and/or a source including a mixture of at least some of the following gases: nitrogen, carbon dioxide, oxygen, argon, and ozone.

As shown in FIG. 1, the controller 40 is also preferably connected to a source 30c of ozone gas. The ozone gas source 30c is preferably an ozone generator capable of converting substances such as pure oxygen, air, or water into ozone gas. For example, the ozone gas source 30c may include an ultraviolet light source for generating ozone. Optionally, the ozone flowing to the controller 40 from the source 30c is mixed with oxygen if the ozone generator does not convert all of the input oxygen into ozone or if some of the generated ozone changes to oxygen. The ozone flowing to the controller may also be mixed with air when air is input to the ozone generator and the air is not completely converted to ozone.

In the controller 40, nitrogen collected by vent 24a is blended with nitrogen flowing directly from nitrogen source 30a, and carbon dioxide collected by vent 24b is blended with carbon dioxide flowing directly from source 30b. The controller 40 controls flow of blended nitrogen, blended carbon dioxide, ozone, and any other gases to the processing areas 10a–10j and to a storage area 50, shown in FIG. 1 and described in more detail below. Because some of the nitrogen, carbon dioxide and/or other gases may originate from the cryogenic freezer 20, the nitrogen, carbon dioxide, and/or other gases directed to the processing areas 10a–10j and storage area 50 are cold enough to cool animal carcasses processed in the processing areas 10a–10j and cool food stored in storage area 50. In addition, the nitrogen, carbon dioxide, ozone, and other gases preferably flow into atmosphere within the processing areas 10a–10j and storage area 50 to reduce microbial growth.

The controller 40 controls the relative amounts of each of the gases being blended and each of the gases flowing to each of the processing areas 10a–10j and the storage area 50. Although the controller 40 preferably blends the respective cold gases collected at the vents 24a and 24b with gases from the sources 30a and 30b, the controller 40 is capable of flowing gases from the vents 24a and 24b or from the sources 30a and 30b without blending them.

In the storage area 50, the cold nitrogen, cold carbon dioxide, ozone, and other gases flowing from the controller 40 are released into atmosphere surrounding food products stored in the storage area 50. The controller 40 regulates the concentrations of gases and temperature in the storage area 50 by controlling the respective amounts of gases flowing to the storage area 50. This extends the storage life of the food products, as compared to conventional cold storage systems, because the nitrogen, carbon dioxide, and ozone control microbial growth and maintain a cooled environment in the storage area 50. In addition, the storage area 50 costs much less to operate because it uses cold nitrogen, cold carbon dioxide, and other gases collected at vents 24a and 24b that would have otherwise been released into the environment and wasted.

Figure 2:
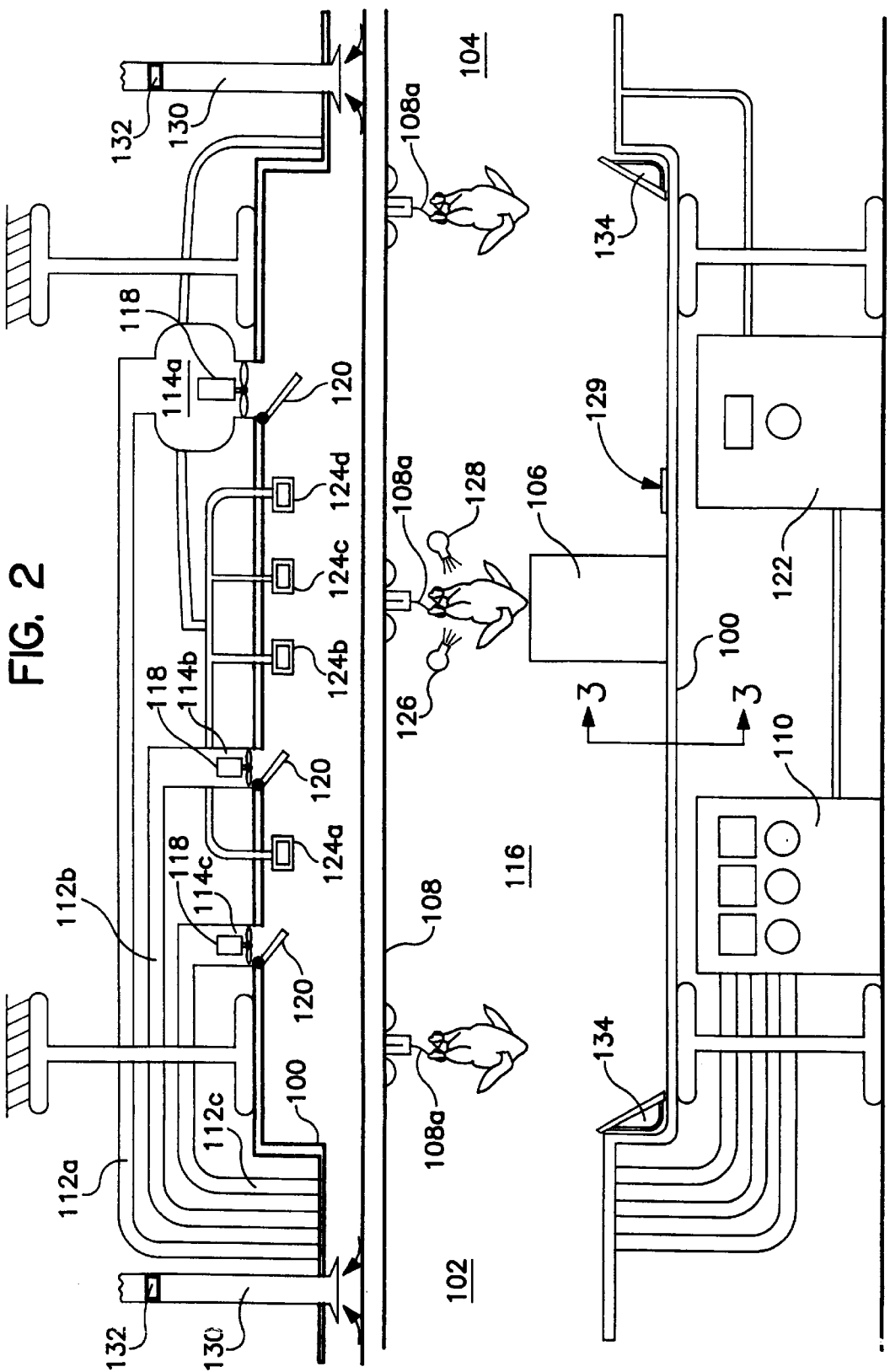
FIG. 2 is a partially schematic view of an interior of processing areas shown in FIG. 1.

FIG. 2 shows the general layout of each of the processing areas 10a–10j. As shown in this figure, each of the processing areas 10a–10j includes walls 100 forming a partially enclosed room having an entrance 102, an exit 104, and an interior 116. Preferably, the corresponding exit 102 and entrance 104 of adjacent pairs of the processing areas 10a–10j are joined to one another to form the tunnel-shaped configuration shown in FIG. 1.

As shown schematically in FIG. 2, each of the processing areas 10a–10j preferably includes processing equipment 106 for performing a step or steps associated with processing a live animal into food. For example, the processing equipment 106 may include an animal washer, an animal head capture device, gas nozzles for spraying an animal with slaughtering gas, a neck slitting device, blood removal drains, a scalding tank, a feather remover, a hide remover, a hair removing device, a viscera remover, a cutting device, a chiller, transporting equipment, or packager, such as a high speed atmosphere controlled packaging device.

A conveyor 108 preferably conveys live animals and/or animal carcasses through each of the processing areas 10a–10j by moving them from the entrance 102 to the processing equipment 106, and then to the exit 104. Each one of the processing areas 10a–10j may include a separate conveyor 108, or adjacent processing areas may have a common conveyor 108. As shown in FIG. 2, the conveyor 108 is preferably an overhead chain driven conveyor having shackles 108a for supporting animal carcasses. Other conveying arrangements, however, may be used without departing from the scope of the invention. For example, the conveyor 108 may be a moving belt positioned below the processing equipment 106 or it may be a channel containing moving water for floating animal carcasses along a path.

As shown in FIG. 2, each of the processing areas 10a–10j includes a processing area controller 110 receiving input of ozone, nitrogen, and carbon dioxide gases from the controller 40 shown in FIG. 1. Supply lines 112a, 112b, and 112b respectively supply ozone, nitrogen, and carbon dioxide from the processing area controller 110 to inlets 1142a, 1142b, and 1142c communicating with the processing area interior 116. Each of the inlets 1142a, 1142b, and 1142c includes a blower fan 118 for forcing the gases into the processing area interior 116 and a movable door 120 for closing the inlets 1142a, 1142b, 1142c when the processing area interior 116 is cleaned.

The processing area controller 110 is coupled to a sensing unit 122 communicating with sensors 124a, 124b, 124c, and 124d for respectively sensing amounts of ozone gas, nitrogen gas, and carbon dioxide gas and the temperature in the processing area interior 116. The processing area controller 110 respectively adds ozone gas optionally in an oxygen and/ or air gas stream, nitrogen gas, and carbon dioxide gas to the processing area interior 116 via the supply lines 112a–112c when the respective amounts sensed by the sensors 124a–124c are less than predetermined amounts sufficient to limit microbial growth. In this manner, the amounts of gases in the atmosphere of the processing area interior 116 are controlled to limit or reduce microbial growth in the processing area interior 116.

The controller 110 preferably maintains the atmosphere of the processing area interior 116 with an amount of ozone, an amount of nitrogen, an amount of carbon dioxide, and a remainder of other gases, such as oxygen or air. For example, the gases flowing into the processing area interior include nitrogen, carbon dioxide, and a mixture containing about 0.5% by weight to about 4% by weight of ozone and a remainder of oxygen or air.

Preferably, the atmosphere in the processing area interior 116 includes about 2% by weight to about 7% by weight of ozone. When poultry, pork, or beef is processed, the processing area interior 116 preferably has about 3.5% by weight of ozone. When seafood is processed, the processing area interior 116 preferably has above about 3.5% of ozone to provide bleaching. In the preferred embodiment, the ozone gas flowing into the processing area 116 is mixed with either oxygen or air because most ozone generators do not convert all input oxygen or air into ozone. However, the total amount of oxygen and/or air in the processing area 116 is preferably insufficient to allow for significant microbial growth.

The processing area controller 110 also adds gases to the processing area interior 116 via the supply lines 112a–112c when the temperature sensed by the temperature sensor 124d is above a predetermined temperature, such as about 33° F. (0.6° C.) to about 40° F. (4.4° C.), which is sufficient to support some microbial growth. Preferably the processing area interior 116 is maintained at about 33° F. to provide maximum microbial growth reduction without freezing any water present in the processing area interior 116.

In addition to reducing or eliminating microbial growth, the gases flowing into the processing area interior 116, such as the cold gases originally collected by the vents 24a and 24b, cool the processing area interior 116 and animal carcasses being processed therein. This cooling also limits or reduces microbial growth in the processing area interior 116.

As will be recognized by those of ordinary skill in the art other gases may be flowed into the processing area interior 116 in response to a sensed temperature or a sensed gas amount. For example, oxygen, argon or a mixture including at least some of the following gases: ozone, nitrogen, carbon dioxide, oxygen, and/ or argon could be added to the processing area interior 116. When air or other gases are used to freeze food cryogenically in freezer 20, these gases can be collected and reused to perform cooling in the processing area interior 116.

As shown in FIG. 2, a nozzle 126 is positioned in the processing area interior 116 to spray a previously compressed gas on the animal carcasses and, optionally, on the processing equipment 106. The gases sprayed from the nozzle 126 are preferably supplied by the processing area controller 110 and the controller 40. The sprayed gas preferably includes ozone, carbon dioxide, nitrogen, and/or a mixture of ozone and at least one of the following gases: nitrogen, carbon dioxide, oxygen, argon, and air.

As the gas is sprayed from the nozzle 126, it expands to cool the carcass cryogenically and thereby reduce microbial amounts on the carcass. In addition, the gas preferably asphyxiates microbes to provide additional reduction in microbial amount.

Also positioned in the processing area interior 116 is a sprayer 128 coupled to a source of a mixture of ozone and water. The sprayer 128 sprays a stream, aerosol, or mist of the ozone and water mixture on the carcass and, optionally, on the processing equipment 106 to wash substances from the carcass and processing equipment 106. After the ozone and water mixture is sprayed, the mixture and any substances carried by the mixture are drained in a drain 129 positioned in a bottom portion of the processing area interior 116. As described in more detail below, the system purifies the water of the drained mixture and recombines it with more ozone to form the ozone and water mixture sprayed by the sprayer 128.

The sprayed zone and water mixture preferably includes at least about 0.00002% by weight of ozone and up to about 0.0018% by weight of ozone. The ozone in the mixture limits or reduces microbial growth on the carcass and equipment 106 to limit or prevent contamination between different carcasses.

Preferably, the water and ozone mixture is chilled to a temperature of from about 33° F. (0.6° C.) to about 40° F. (4.4° C.) so that the mixture sprayed from the sprayer 128 cools the carcass while it is being processed. This cooling also reduces the amount of microbes on the carcass.

Because excessive amounts of the processing area gases, such as ozone, are toxic to humans, the walls 100 isolate the atmosphere in processing area interior 116 from workers to maintain human safety. This is in contrast to conventional food processing facilities where workers are present in the immediate vicinity of food processing equipment.

Preferably, the walls 100 of each of the processing areas 10a–10j are sealed to prevent leakage of gases from anywhere other than the entrance 102 and exit 104 of the processing area interior 116. When the gases pass into the entrance 102 and exit 104, negative pressure exhaust passages 130 positioned in the entrance 102 and exit 104 remove the gases so that they do not pass into other areas of the food processing system. To destroy potentially toxic amounts of ozone gas, each of the exhaust passages 130 optionally includes an ozone gas scrubber 132, such as a manganese dioxide filter.

When the gases removed by the negative pressure exhaust passages 130 have not been heated significantly, the system preferably recycles these gases for reuse in the processing areas 10a–10j. This recycling is performed by directing the collected gases from the exhaust passages 130 to the processing area controller 110 when the gases are below a predetermined temperature, such as about —50° F. (—45.6° C.) to about 0° F. (—17.8° C.). The processing area controller 110 then distributes these recycled gases to one of the supply lines 112a–112c or the nozzle 126. This gas recycling reduces the amounts of gases required to perform cooling and thereby increases the cooling efficiency of the system.

After the ozone and water mixture is sprayed from the sprayer 128, some of the ozone gas may come out of the mixture and be released into the processing area interior 116. Preferably, this ozone is collected by the exhaust passages 130 and reused during food processing. In the alternative, this collected ozone gas is scrubbed from the gases exhausted from the processing area interior 116 when the ozone gas scrubber 132 is present.

As shown in FIG. 2, emitters 134, such as ultrasonic oscillators or speakers, are preferably positioned in the processing cells 10a–10j. The emitters 134 emit ultrasonic vibrations or oscillations in the processing cell interior 116 to loosen microbes from exterior surfaces of the carcasses and processing equipment 106. To remove a significant number of microbes, the emitters 134 preferably emit the ultrasonic vibrations while the ozone and water mixture is sprayed from sprayer 128. For example, the frequency of the ultrasonic oscillations may be about 100.6 kHz to about 848.2 kHz, or below or above this range.

Figure 3:
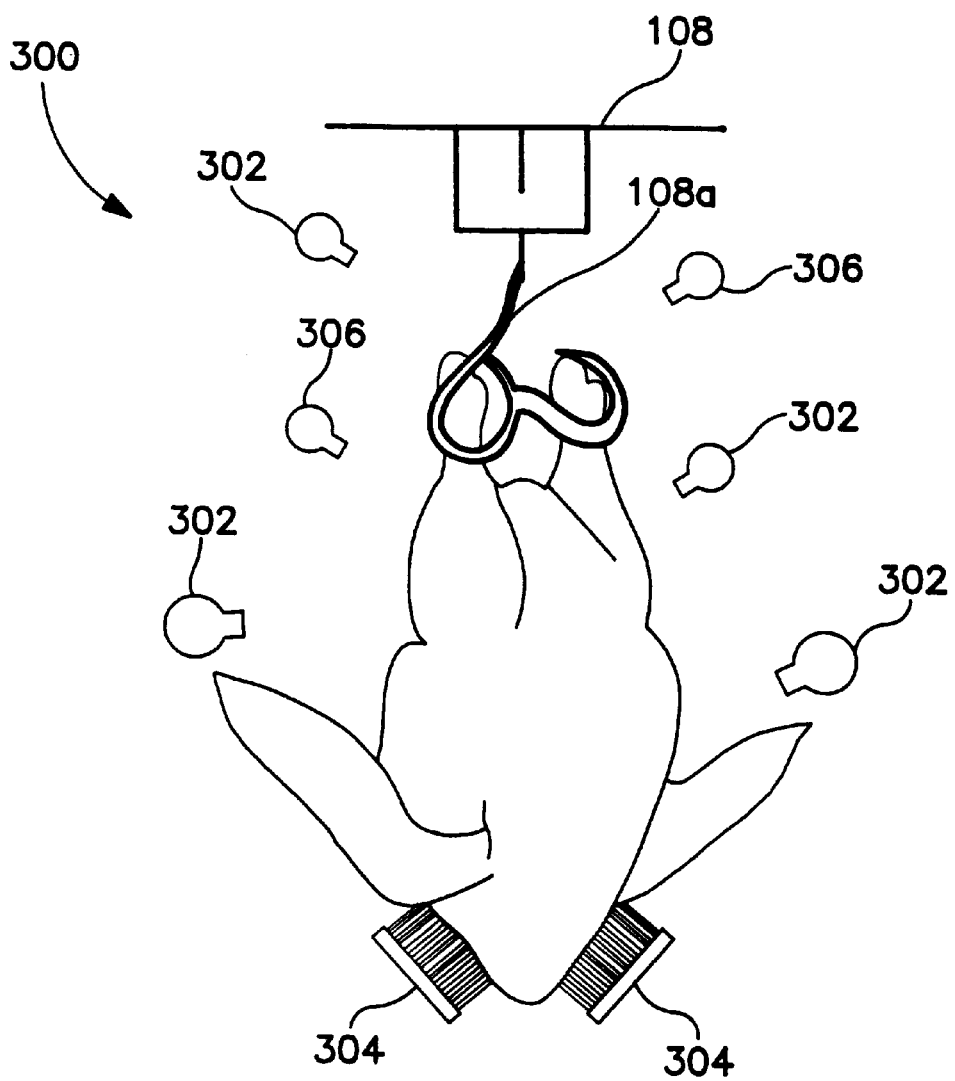
FIG. 3 is a cross sectional view taken along line 3—3 of FIG. 2 and shows passages in a wall of the processing areas.

As shown in FIG. 3, the walls 100 of the processing areas 10a–10j include internal passages 134. These internal passages 134 are in communication with the gases flowing from processing area controller 110 so that the walls 100 form a heat exchanger for removing heat from the processing area interior 116. In response to an increased temperature being sensed by the temperature sensor 124d, the processing area controller 110 sends to the internal passages 134 cold gases, such as the cold nitrogen and/or carbon dioxide gases collected by the vents 24a and 24b. The cold gases flow in the internal passages 134 and act as a heat exchange medium to remove heat from the processing cell interior 116 through the portion of the wall 100 facing the processing cell interior 116. After the gases flow through the internal passages 134 and absorb heat, they are either vented into the environment or directed back to the processing area controller 110 for reuse.

The food processing system cools a carcass in at least four different ways during food processing: 1) by flowing gases into the processing area 116 through the inlets 114a–114c, 2) by spraying gases directly on the carcass from the nozzle 126, 3) by spraying the ozone and water mixture on the carcass from the sprayer 128, and 4) by directing gases through the internal passages 134. Preferably, the gases used to perform the cooling of 1), 2), and 4) include the gases collected by the vents 24a and 24b from the cryogenic freezer 20.

In contrast to conventional food processing system in which a carcass is cooled only at the end of a processing line, the present invention cools an animal carcass as soon as it is practical and as much as possible during processing to maximize shelf life and reduce microbial growth. In particular, the food processing system preferably cools the animal carcass immediately after it is slaughtered and drained of blood, because blood drainage may be hindered by reduced temperatures. Preferably, the food processing system continues this cooling up to and including the time when the carcass is processed further and packaged. To maximize cooling efficiency in some instances where the animal carcass is heated during food processing, for example, to loosen feathers or remove a hide, the carcass cooling is initiated after heating rather than immediately after slaughter and blood drainage.

Because the ozone and water mixture and gases, such as ozone, carbon dioxide, and nitrogen, are used for cooling, rather than pure water, the present invention requires less water than conventional food processing systems. The preferred embodiment of the invention uses a reduced amount of fresh water and produces a reduced amount of waste water by purifying and recycling water used by the system.

Figure 4:
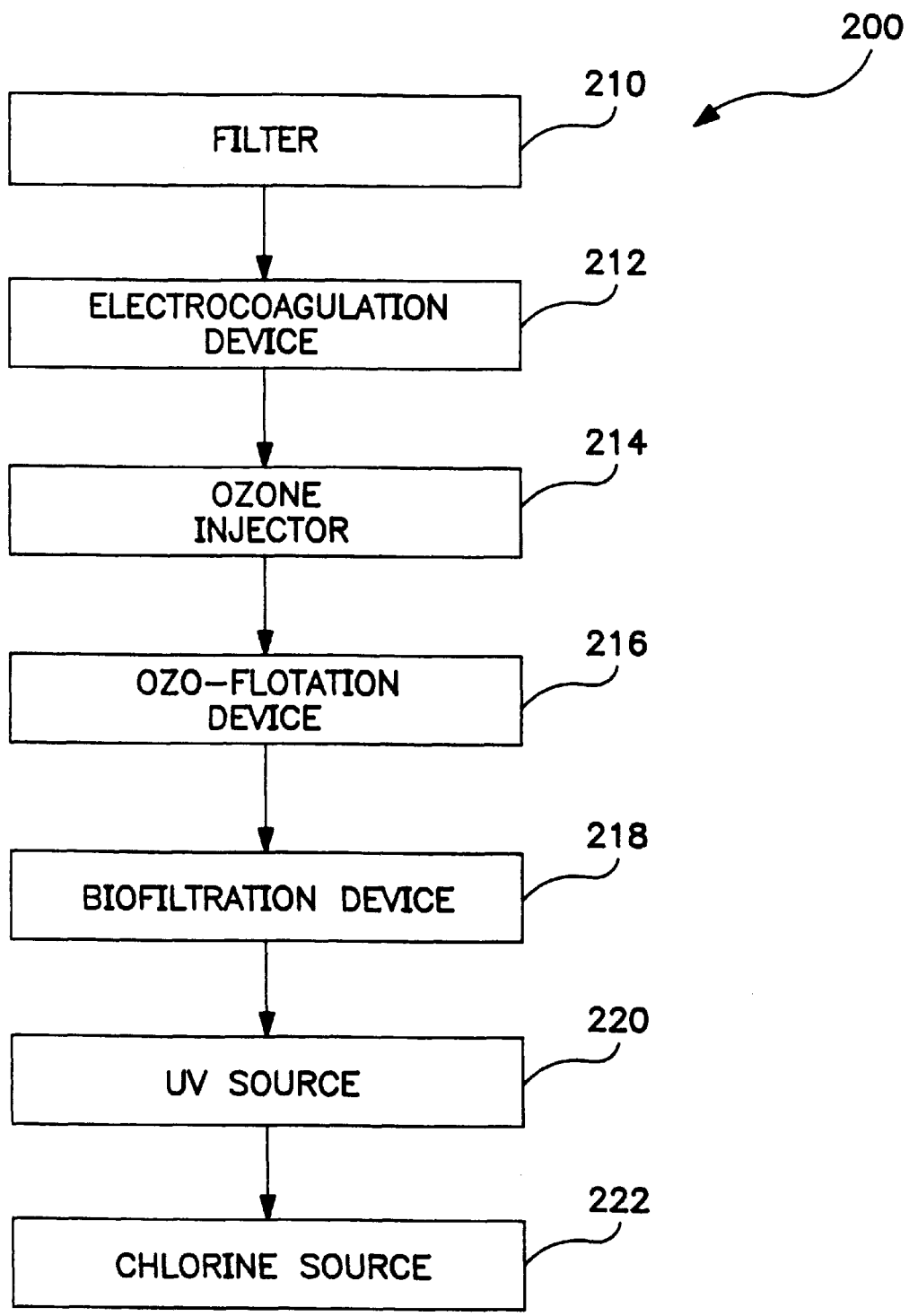
FIG. 4 is a schematic view of a water purifier used with the processing system of FIG. 1.

Preferably, the system includes a water purifier 200, shown in FIG. 4, for converting water used in the cells 10a–10j into potable form. Water, previously used in the cells 10a–10j, is drained through the drain 129, shown in FIG. 2, and flows through a filter 210 that removes solid particles suspended in the water so that the light transmissivity of the water is at least 80 nanometric turbity units (NTU). The filter 210 may be any type of conventional device for filtering solids, such as, for example, those disclosed in U.S. Pat. Nos. 5,322,623; 5,318,708; and 5,262,047, the disclosures of which are incorporated herein by reference.

After passing through the filter 210, the purifier 200 removes dissolved solids in the water by passing the water through one or more of the following conventional water purification devices: an inline electrocoagulation device 212 that sends a DC current through the water to drive particles, such as organic material, from the water; an inline ozone injector 214 that injects ozone into the water to increase the oxygen level of the water and correspondingly reduce the biological oxygen demand of the water; an ozo-flotation device 216 that cleanses, purifies, deodorizes, and stabilizes the water by bubbling ozone through the water to disturb the polar balance between particles and float the particles to the top of a tank where a paddle removes them; and a biofiltration device 218 including an activated carbon filter having special bacteria grown thereon to reduce contaminants and carcinogens by converting them into acid.

The purifier 200 then purifies the water further by exposing the water to ultraviolet light emitted from an ultraviolet light source 220 and adding 2–4 ppm chlorine from a chlorine source 222. The resulting water is preferably potable and can therefore be reused by the system. Preferably, the purified water has a total plate count of less than 500 colony forming units per milliliter (CFU/ml), no coliform or *E. coli*, total organic carbon of less than 100 mg/l, and a percent light transmittance where less than 5 of each water sample has no more than 1 NTU and none of the water is greater than 5 NTU.

Figure 5:
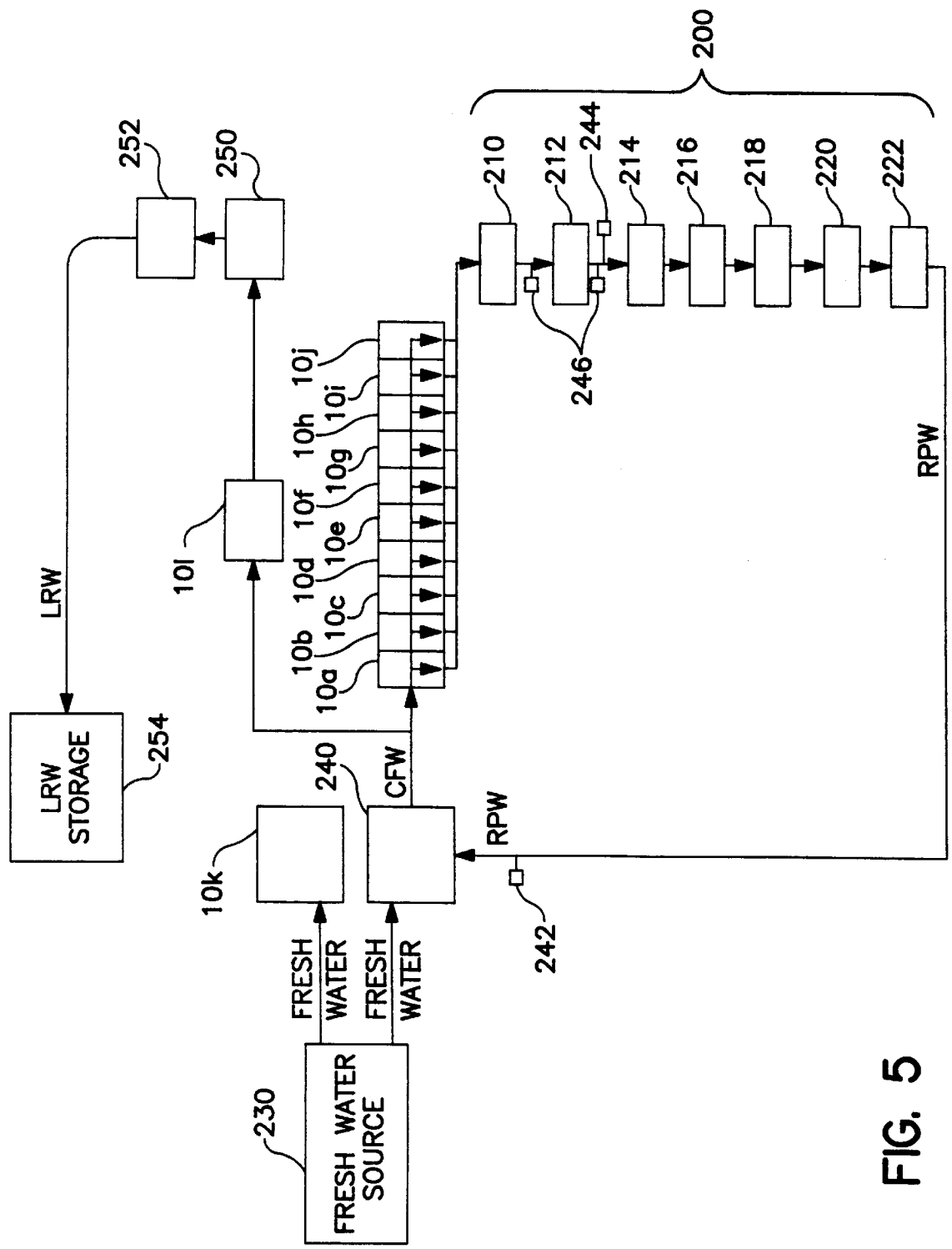
FIG. 5 is another schematic view of the food processing system of FIG. 1 and includes lines representing water flow in the system.

FIG. 5 is a water flow diagram for the food processing system. As shown in FIG. 5, fresh water from a fresh water source 230 enters the food processing system. A blending device 240 automatically combines the fresh water from the fresh water source 230 with reconditioned potable water (RPW), which has been purified by the purifier 200, to create complex feed water (CFW).

Preferably, a total organic carbon detector 242 measures the amount of total organic carbon in the RPW before the RPW flows into the blending device 240. In response to signals from the total organic carbon detector 242, the blending device 240 automatically adds fresh water to the RPW when the sensed amount of total organic carbon rises above a maximum level, such as, for example, 100 mg/l. Preferably, the blending device 240 continuously blends a sufficient amount of fresh water with the RPW to regulate the amount of total organic carbon in the resulting CFW.

The CFW flows to the processing areas 10a–10j where it is combined with ozone, such as the ozone from source 30c shown in FIG. 1, and sprayed, for example, by sprayer 128 on animal carcasses and processing equipment 106. As explained above, the ozone and water mixture is used to cool the animal carcass, reduce microbial growth on both the processing equipment 106 and carcass, and wash substances from both the carcass and processing equipment 106. After performing these functions, the water and ozone mixture is drained from the processing areas 10a–10j and carries washed substances along with it.

The purifier 200, described above, then removes particles from the water and the purified water (RPW) renters the blending device 240 for reuse. As shown in FIG. 5, the purifier 200 may include an ozone monitor 244 that determines the oxidation reduction potential of the water, and light transmission monitors 246 that measure the turbidity of the water. Preferably, some or all of the devices 210–222 of the purifier 200 act in response to the monitors 244 and 246 to reduce amounts of contaminants in the water passing from processing areas 10a–10j.

Because the system purifies water used during food processing and reuses the water, the amount of fresh water required by the food processing system is significantly reduced from that required by conventional systems. For example, when the system is used to process poultry, the system reuses about 90% of the water and requires significantly less fresh water than conventional food processing systems. In conventional poultry processing, about 7 to 10 gallons (26.5 to 37.9 liters) of fresh water is required for each chicken that is processed. When the present invention is used for poultry processing, it preferably uses only about 0.75 gallons (2.8 liters) to about 1 gallon (3.8 liters) of fresh water. The resulting fresh water savings significantly reduces food processing cost and allows for food processing in geographic areas having a limited supply of fresh water.

If a processing area, such as processing area 10k, shown in FIG. 5, requires fresh water that has not been blended with recycled water, the food processing system directs fresh water from the fresh water source 230 directly to the processing area 10k without blending it with the RPW.

Some of the processing areas, such as a processing area 10L, may add to the CFW substances, such as large amounts of fecal matter or salt, that are difficult to remove completely and may contaminate or "damage" the RPW. Water flowing from the cell 10L is preferably filtered by a particle filter 250 like the filter 210 and chlorinated with chlorine from a secondary chlorine source 252 to create limited reuse water (LRW) that is stored in LRW storage 254. Rather than being used in the processing areas 10a–10j during food processing, the LRW stored in LRW storage 254 is preferably used in areas of the system that do not require potable water, such as a cooling tower, a vacuum device, an animal pen wash device, a truck washing area, or a soil cleaning device (not shown).

Methods of processing live chickens into food with the structure shown in FIGS. 1–5 and additional structure shown in FIGS. 6–10 are discussed below. Although the invention is described in association with poultry processing, it should be understood that the invention in its broadest aspects is not so limited. For example, the invention may be readily practiced to process many different types of animals such as cattle, swine, sheep, lamb, ostrich, seafood including fish, or types of fowl other than chickens, such as turkeys and ducks. In addition, the method of the invention in its broadest sense could be practiced with structure different from that described in connection the embodiments shown in FIGS. 1–10.

To process chickens into food, live chickens are delivered to the food processing system and workers place the chickens in the shackles 108a of the conveyor 108. Initially, the conveyor 108 moves the live chickens through processing area 10a, which includes a washer 300, shown in FIG. 6. The washer 300 has a plurality of sprayers 302 coupled to a source of the ozone and water mixture that is pressurized at a pressure of from about 1,200 pounds per square inch (8,273,708 N/m$^2$) to about 2,000 pounds per square inch (13,789,514 N/m$^2$). The ozone and water mixture preferable includes at least about 0.00002% by weight of ozone and up to about 0.0018% by weight of ozone.

The sprayers 302 are preferably positioned so that they spray the mixture at particular areas of the live chickens, such as the rear end, to wash soil, filth, and fecal matter from each of the chickens. This is in contrast to conventional food processing methods in which live animals are not washed prior to being processed.

In addition to the sprayers 302, the washer 300 includes brushes 304 for scrubbing the chickens being conveyed by the conveyor 108, and nozzles 306 for spraying the chickens with a gas mixture including from about 1% to about 5% by weight of ozone. The ozone in the mixtures sprayed respectively from the sprayers 302 and nozzles 306 significantly reduces microbial growth and the amount of microbes on the chickens.

After the chickens are washed in the processing area 10a, the conveyor 108 conveys the chickens to the processing area 10b. The atmosphere in the processing cell 10b includes ozone in combination with a gas mixture of nitrogen and/or argon, optionally some carbon dioxide, and a small amount of oxygen or air. Preferably, the processing cell atmosphere includes ozone combined with the nitrogen, argon, carbon dioxide, and/or oxygen gas mixtures disclosed in European Patent Application Publication No. 0 434 278 A1, published on Jun. 26, 1991.

For example, the atmosphere in the processing cell/ 10d may include from about 0.0007% by weight to about 0.0018% by weight of ozone. The remainder of the atmosphere includes at least about 98% by weight of nitrogen, argon, carbon dioxide, and a remainder of oxygen. As the chickens breathe these gases, they are stunned and almost instantly slaughtered to produce a carcass without significant suffering.

During the slaughter, the chickens become exposed to the ozone blended in the processing cell atmosphere so that microbial growth on the exterior surface of the chickens is reduced even further. This is significant because most, if not all, known gas slaughtering processes do not employ a gas or other means for reducing pathogen growth on a resulting animal carcass.

Although gases are preferably used to slaughter the chickens in processing area 10d, other slaughtering or stunning processes may be used. For example, the chickens may be stunned with a conventional device (not shown) that sends an electrical pulse through each chicken.

As the processing continues, the chicken carcasses are conveyed into the processing areas 10c and 10d, where the necks of the chicken carcasses are severed and blood is allowed to drain from the carcasses, respectively. In processing areas 10c and 10d, nozzles and sprayers, such as nozzle 126 and sprayer 128 shown in FIG. 2, preferably spray ozone and the mixture of ozone and water directly at each of the chicken carcasses to reduces the amount of microbes during neck severing and blood drainage. Optionally, the processing areas 10c and 10d also include the washer 300 shown in FIG. 6.

The conveyor 108 then transports the chicken carcasses to a scalding device (not shown) positioned in processing cell 10e. Each of the chicken carcasses is dipped into heated liquid contained in the scalding device to loosen feathers from the exterior surface of the carcasses. For example, the scalding device may be configured like the scalding system disclosed in U.S. Pat. No. 4,996,741, which is incorporated herein by reference.

After scalding, the conveyor 108 moves the chicken carcasses through the processing areas 10f–10j, where the ozone and water mixture and the gases, such as ozone and/or the gases collected by the vents 24a and 24b of the cryogenic freezer 20, preferably cool the chicken carcasses for the remainder of the processing. As described above in connection with the description of the processing area interior 116 shown in FIG. 2, cooling is performed by spraying the ozone and water mixture from the sprayer 128 in a stream, aerosol, or mist directly on the carcasses, spraying gas from the nozzle 126 directly on the carcasses, directing gas through inlets 1142a–1142c into the processing cell interior 116, and/or flowing the gas through the interior passages 134 in walls 100.

The chicken carcasses are preferably cooled immediately after scalding because the cooling would be inefficient if it took place prior thereto. A carcass chiller, such as carcass chiller 600 shown in FIG. 10 and described in more detail below, is preferably used to perform this cooling rapidly. Cooling the chicken carcasses prior to feather removal loosens feathers from the carcass and closes pores in the carcass skin thereby reducing the likelihood of trapping microorganisms in the pores. If the chicken carcasses are not scalded to loosen feathers, the cooling is initiated immediately after blood is drained from the carcasses. In the alternative, the cooling could be initiated immediately after slaughter if this does not hinder blood drainage.

Figure 7:
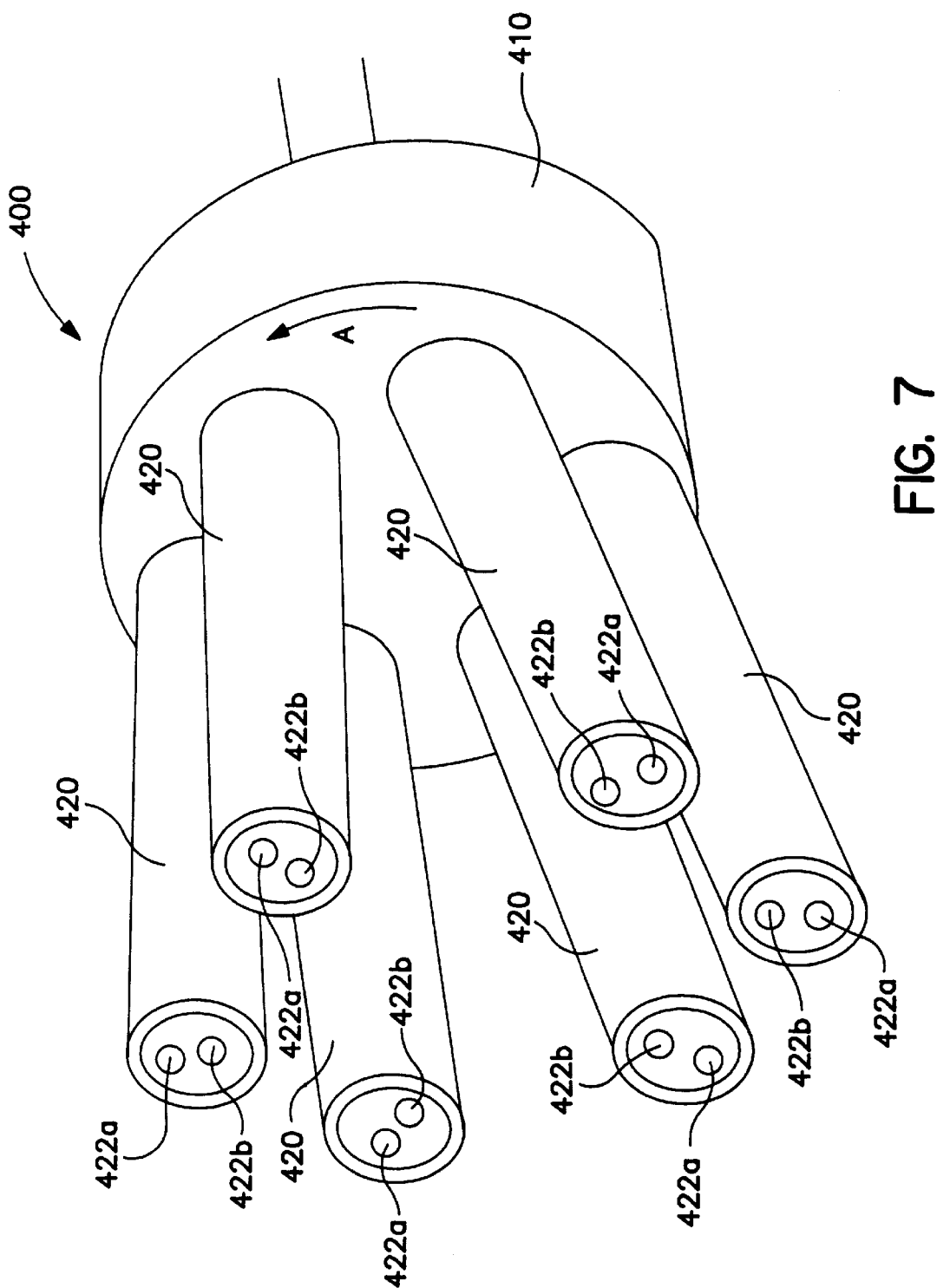
FIG. 7 is a partial view of a feather remover used in one of the processing areas shown in FIG. 1.

The processing area 10f includes at least one feather remover 400 shown in FIG. 7. The feather remover 400 includes a support 410 coupled to a motor (not shown) so that the support 410 and a plurality of tines 420 mounted to the support 310 rotate, for example, about an axis of the support 410 in a direction A.

Each of the tines 420 includes a first lumen in fluid communication with a source of the of ozone and water mixture, and a second lumen in fluid communication with a source of trisodium phosphate. The first and second lumens have respective openings 422a and 422b for spraying the ozone and water mixture and the trisodium phosphate on chicken carcasses during feather removal.

As chicken carcasses are conveyed through the processing area 10e, the support 410 rotates so that the tines 420 come in contact with the outer surface of the chicken carcasses and remove feathers therefrom. While the feathers are being removed, the ozone and water mixture and trisodium phosphate are sprayed from the openings 422a and 422b, respectively. In addition, ultrasonic oscillations are preferably emitted from the emitters 134 shown in FIG. 2.

Because the chicken carcasses enter the processing area 10f after being scalded in the processing area 10e, pores in the exterior surface of each of the chicken carcasses are open. The trisodium phosphate sprayed from openings 422b is forced into these open pores and renders the exterior surface of the chicken carcasses extremely slippery. This makes it difficult for bacteria and other microbes to attach to the slippery exterior of the chicken carcasses as the ozone and water is sprayed from the openings 422a to wash microbes from the carcasses.

The ultrasonic oscillations generated by the emitters 134 loosen the bacteria and other microbes from the chicken carcasses. This also assists in removing bacteria and other microbes from the exterior of the chicken carcasses as the chicken carcasses are sprayed with the ozone and water mixture.

Although the feathers are preferably removed when the tines 420 contact the outer surface of the chicken carcasses, the feathers could be removed in other ways. For example, the ozone and water mixture and/or trisodium phosphate sprayed from the tines 420 could remove the feathers without having the tines 420 themselves come in contact with the carcass. In addition, the ultrasonic oscillations emitted from the emitters 134 could remove feathers.

After the feathers are removed in the processing area 10f, the conveyor 108 moves the chicken carcasses into processing area 10g, where processing equipment 106 removes viscera from the conveyed chicken carcasses. For example, the processing equipment 106 for removing viscera preferably includes croppers, neck breakers, head pullers, venters, openers, eviscerators, inside/outside bird washers, and/or lung removal vacuums.

Figure 8:
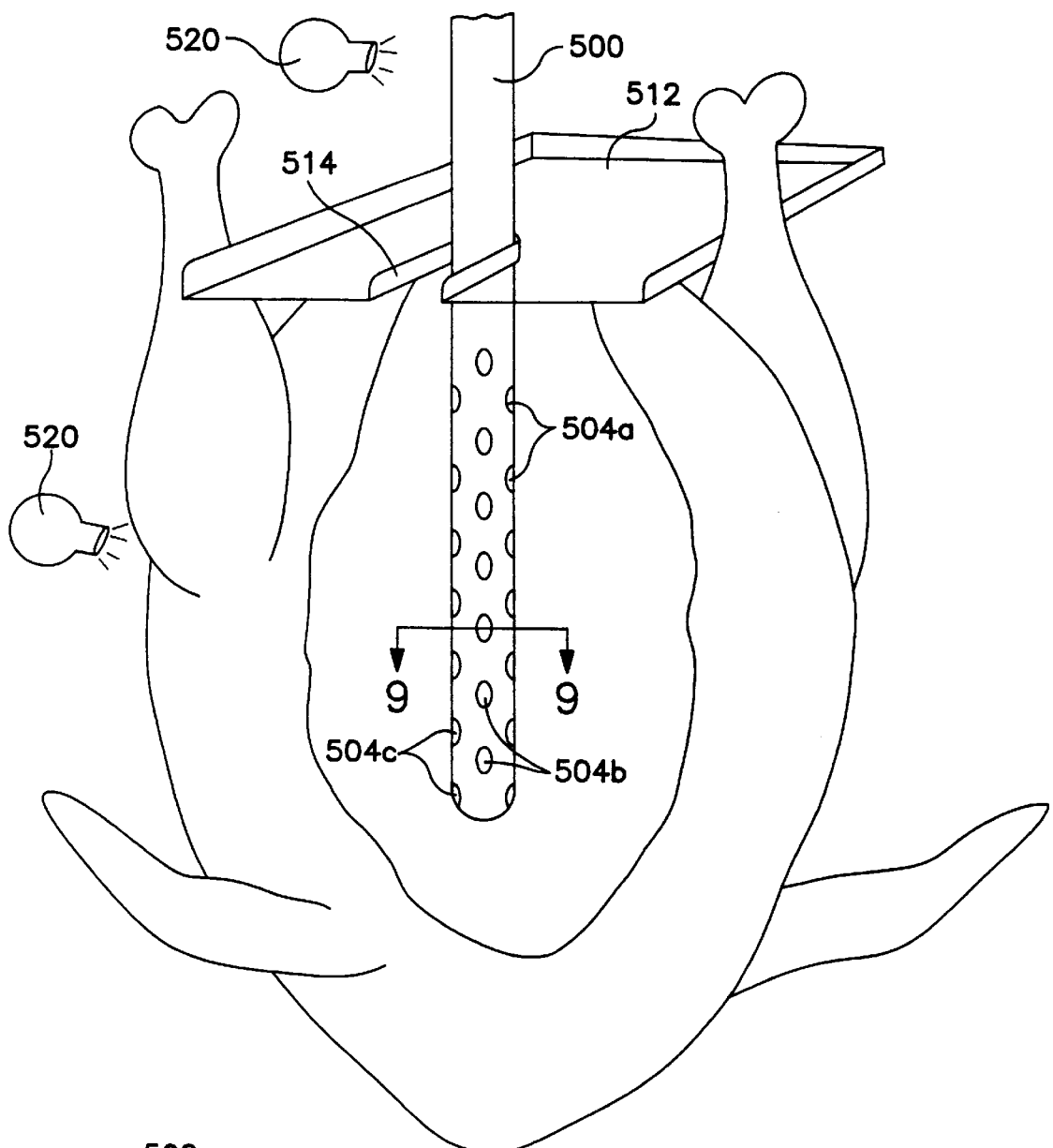
FIG. 8 is a partially schematic view of a conduit, shield, and sprayers for processing a chicken carcass in one of the processing areas shown in FIG. 1.
Figure 9:
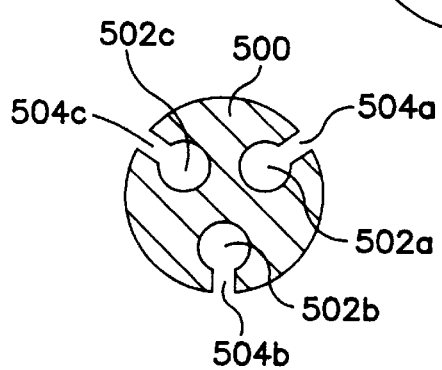
FIG. 9 is a cross section of the conduit taken along line 9—9 of FIG. 8.

To cool the chicken carcasses and reduce microbial growth after viscera removal, a conduit 500, shown in FIGS. 8 and 9, is inserted into an internal cavity of the carcasses and substances, such as nitrogen gas, carbon dioxide gas, ozone gas, and/or a mixture of ozone and water, are sprayed from the conduit 500 into the cavity. As shown in FIGS. 8 and 9, the conduit 500 includes a plurality of lumens 502a, 502b, and 502c coupled to sources of the substances and a plurality of apertures 504a, 504b, and 504c respectively communicating with the lumens 502a–502c to spray the substances therefrom.

As the conduit 500 enters the cavity of a chicken carcass, a shield 512, shown in FIG. 8, is moved toward the conduit 500 so that the conduit 500 is positioned within a slot 514 in the shield 512. The shield 512 covers an opening in the chicken carcass to partially trap gases being sprayed in the cavity of the carcass. The sprayed gases, such as nitrogen, carbon dioxide, and/ or ozone, preferably fill the cavity and purge any oxygen residing in the cavity. This is significant because many microbes are unable to survive in the absence of oxygen.

Sprayers 520 are positioned to spray the ozone and water mixture on the exterior of the chicken carcass and the exterior surface of the conduit 500 as the conduit 500 is removed from the cavity. Preferably, the emitters 134, shown in FIG. 2, emit ultrasonic oscillations while the ozone and water mixture is sprayed to loosen microbes from the chicken carcasses.

The sprayed ozone and water mixture reduces microbial growth and prevents cross contamination between chicken carcasses as the conduit 500 is inserted from one chicken carcass into another. To shield the chicken carcass from any substances sprayed off of the conduit 500, the shield 512 covers the chicken carcass while the sprayers 520 spray the ozone and water mixture.

The chicken carcasses are conveyed from the processing area 10g into processing area 10h. The processing area 10h includes a carcass chiller 600, shown in FIG. 10, containing chilled ozonated water. The carcass chiller 600 is preferably constructed like the carcass chiller and sterilizer disclosed in U.S. Pat. No. 4,827,727, which is incorporated herein by reference. Because the chicken carcasses are cooled in each of the processing areas 10f through 10h, the size of the carcass chiller 600 may be smaller than that required in conventional chicken processing to chill a carcass to a predetermined temperature.

As shown in FIG. 10, the carcass chiller 600 preferably includes ultrasonic emitters 610, similar or identical to the emitters 134 shown in FIG. 2. Each of the chicken carcasses are dipped in the carcass chiller 600 as the conveyor 108 moves them through the processing area 10h so that the chilled ozonated water in the carcass chiller 600 surrounds the carcasses. When the carcasses are in the ozonated water, ultrasonic oscillations emitted from emitters 610 dislodge bacteria and other microbes trapped in the pores of the chicken carcasses so that the ozone in the ozonated water destroys them.

Optionally, the processing area 10h also includes an additional ozonated water bath (not shown) for contacting an external surface of the chicken carcass with ozonated water while the carcasses are submerged. For example, the poultry carcasses may be exposed to ozonated water in the manner described in U.S. Pat. Nos. 4,849,237 and 5,227,184, the disclosures of which are incorporated herein by reference.

If the chicken carcass is to be cut into portions before it is packaged, the chicken carcass is conveyed by the conveyor 108 into the processing area 10i. In the processing area 10i, cutting implements (not shown) cut the chicken carcass into portions and the portions are separated according to the manner in which they will be packaged. Preferably, the nozzle 128, shown in FIG. 2, sprays the cutting implements with the ozone and water mixture. This reduces microbial growth and limits the possibility of cross contamination when the cutting implements slice different chicken carcasses.

If the chicken carcass is to be packaged, the conveyor 108 conveys the chicken carcass to the processing area 10j, which includes packaging machinery (not shown). Preferably, the chicken carcasses are packaged in modified atmosphere packaging containing gas mixtures including ozone. These gas mixtures prolong shelf life and resist decolorization of the chicken meat. For example, the packaging machinery may package the chicken carcasses by using the controlled atmosphere packaging methods described in U.S. Pat. Nos. 4,933,411 or 5,352,467, the disclosure of which are incorporated herein by reference.

The resulting packaged and unpackaged poultry food products can be stored in the storage area 50, frozen in the cryogenic freezer 20, or shipped to other locations. In addition, the unpackaged poultry products can be processed further such as by breading or frying.

As the live chickens are processed into food, the atmosphere in each of the processing areas 10a–10j is controlled to reduce microbial growth and prolong shelf life. Because the chicken carcass is heated in the scalding tank, cooling with the gases and mixture of ozone and water preferably takes place only after scalding. However, when the invention is practiced to process chicken or other animals into food without scalding or heating the carcass, the gas cooling may be conducted throughout the food processing immediately after the animal is slaughtered and bled.

During poultry processing or processing of other animals, the water used in each of the processing areas 10a–10j is collected and reused in the processing areas 10a–10j after it is purified to potable form by the water purification system shown in FIG. 5. Because a substantial amount of the water is reused, =the present food processing system represent a dramatic improvement over existing food processing systems.

It will be apparent to those skilled in the art that various modifications and variations can be made to the structure and methodology of the present invention without departing from the scope or spirit of the invention. In view of the foregoing, it is intended that the present invention cover modifications and variations of this invention provided they fall within the scope of the following claims and their equivalents.

What is claimed is:

1. A method of reducing microbial growth during processing of an animal carcass, comprising the steps of:

processing an animal carcass ;

heating an exterior surface of the animal carcass to open pores in the exterior surface of the animal carcass; and spraying the animal carcass with trisodium phosphate while the pores are open.

2. The method of claim 1, wherein the heating of the exterior surface of the carcass comprises placing heated liquid in contact with the carcass.

3. The method of claim 1, further comprising removing feathers from the heated exterior surface of the carcass.

4. The method of claim 1, further comprising spraying the carcass with a mixture of water and a substance for reducing microbial growth on the carcass.

5. The method of claim 4, further comprising collecting sprayed water, purifying the water, and reusing the purified water during processing of animal carcasses.

6. The method of claim 4, wherein the substance comprises ozone.

7. The method of claim 1, wherein the trisodium phosphate reduces adherence of microbes on the exterior surface of the carcass.

8. The method of claim 1, wherein the spraying further comprises spraying water and wherein the method further comprises collecting sprayed water, purifying the water, and reusing the purified water during the processing.

9. A method of reducing microbial growth while removing feathers from a fowl carcass, the method comprising the steps of:

heating the exterior of a fowl carcass;

rotating a plurality of tines about an axis of rotation;

removing feathers from the exterior of the fowl carcass; and spraying the carcass with at least one of an ozone and water mixture and trisodium phosphate while the feathers are being removed to reduce microbes on the carcass.

10. The method of claim 9, wherein the step of spraying includes the substeps of spraying the ozone and water mixture through a first aperture in the tines and spraying the trisodium phosphate through a second aperture in the tines.

* * * * *